United States Patent [19]

Koyama

[11] Patent Number: 5,123,058
[45] Date of Patent: Jun. 16, 1992

[54] IMAGE PROCESSING METHOD

[75] Inventor: Hiroo Koyama, Kaisei, Japan

[73] Assignee: Fuji Photo Film Co., Ltd., Kanagawa, Japan

[21] Appl. No.: 494,298

[22] Filed: Mar. 16, 1990

[30] Foreign Application Priority Data

Mar. 20, 1989 [JP] Japan .................................. 1-68975

[51] Int. Cl.⁵ .................................................. G06K 9/36
[52] U.S. Cl. ....................................... 382/47; 340/731
[58] Field of Search ............................ 382/47; 340/731

[56] References Cited

U.S. PATENT DOCUMENTS 4,701,961 10/1987 Hongo .................................. 382/47
4,941,195 7/1990 Tanaka et al. ........................ 382/47
5,029,228 7/1991 Nonoyama et al. .................. 382/47

*Primary Examiner*—Leo H. Boudreau
*Attorney, Agent, or Firm*—Sughrue, Mion, Zinn, Macpeak & Seas

[57] ABSTRACT

An image processing method for conducting a diversification processing on an original image. An image data written in a work area is shifted by a number corresponding to the amount of the diversification processing and the data obtained through shifting is logically processed to form a predetermined image data. Then, logical computation is conducted on the original image data written in another work area and the above-mentioned predetermined image data, whereby a diversification processing is conducted at a high speed.

2 Claims, 2 Drawing Sheets

FIG. I

IMAGE PROCESSING METHOD

BACKGROUND OF THE INVENTION

The present invention relates to an image processing method for effecting a diversification processing, e.g., shadowing, to a dot-matrixed bit-map image data.

Hitherto, a method has been proposed for forming a modified letter, e.g., a bordered letter, shadowed letter and so forth, by effecting a diversification processing on dot-matrixed letter data. According to this method, first and second data are formed by incrementing or decrementing the coordinates of the points where the levels of the dot signals are changed from white to black and vice versa in the dot-matrixed letter data both in the direction of main scan and in the direction of auxiliary scan perpendicular to the main scan. Then, a logical sum or logical product of these first and second data is further logically processed together with the dot-matrixed letter data, whereby a modified letter is formed. Thus, the diversification processing for forming a modified letter relies upon shifting of the coordinates of the contour of the dot-matrixed letter up and down and to the left and right. This method is disclosed in, for example, Japanese Patent Application No. 145986/1983.

The above-mentioned method, however, is applied only to letter image which permits an easy pickup of contour coordinate data, and cannot be applied to bit-map image data. Conventionally, therefore, a diversification processing of the image data has been conducted by forming a plurality of data by shifting the image data in a dot-by-dot fashion and determining logical sum or logical product of such data.

Thus, in the known diversification process for the bit-map image data, the image data is shifted only in dot-by-dot manner, so that the processing times increases in proportion to increase in the amount of processing, which is inconvenient particularly when the amount of processing is large.

SUMMARY OF THE INVENTION

Accordingly, an object of the present invention is to provide an image processing method which is capable of performing at a high speed a diversification processing on bit-map image data, thereby overcoming the above-described problems of the prior art.

To this end, according to the present invention, there is provided an image processing method for effecting a diversification processing on a dot-matrixed bit-map original image data in an amount of n and m dots (n and m being integers which are elementary to each other), the method comprising: forming a predetermined image data on the basis of the quotient (m/n) of the amounts n and m of amounts of the processing; forming at least two work areas equivalent to the image data of; and successively writing the predetermined image data on the original image data in the work area, thereby conducting the diversification processing at a high speed.

The nature, principle and utility of the invention will become more apparent from the following detailed description when read in conjunction with the accompanying drawings.

DESCRIPTION OF THE PREFERRED EMBODIMENT

Figure 1:
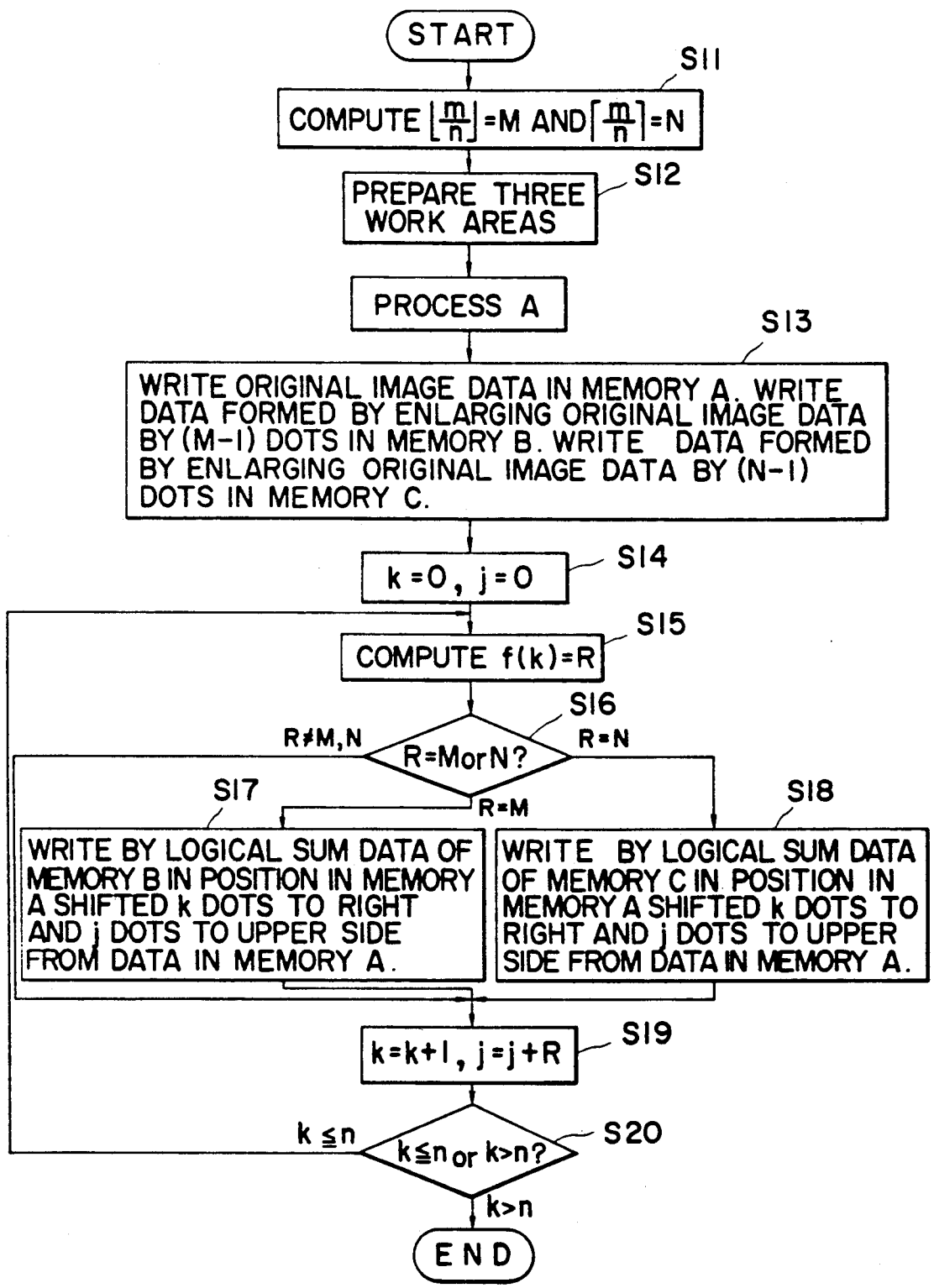
FIGS. 1 and 2 are flow charts illustrating an embodiment of the image processing method of the present invention.
Figure 2:
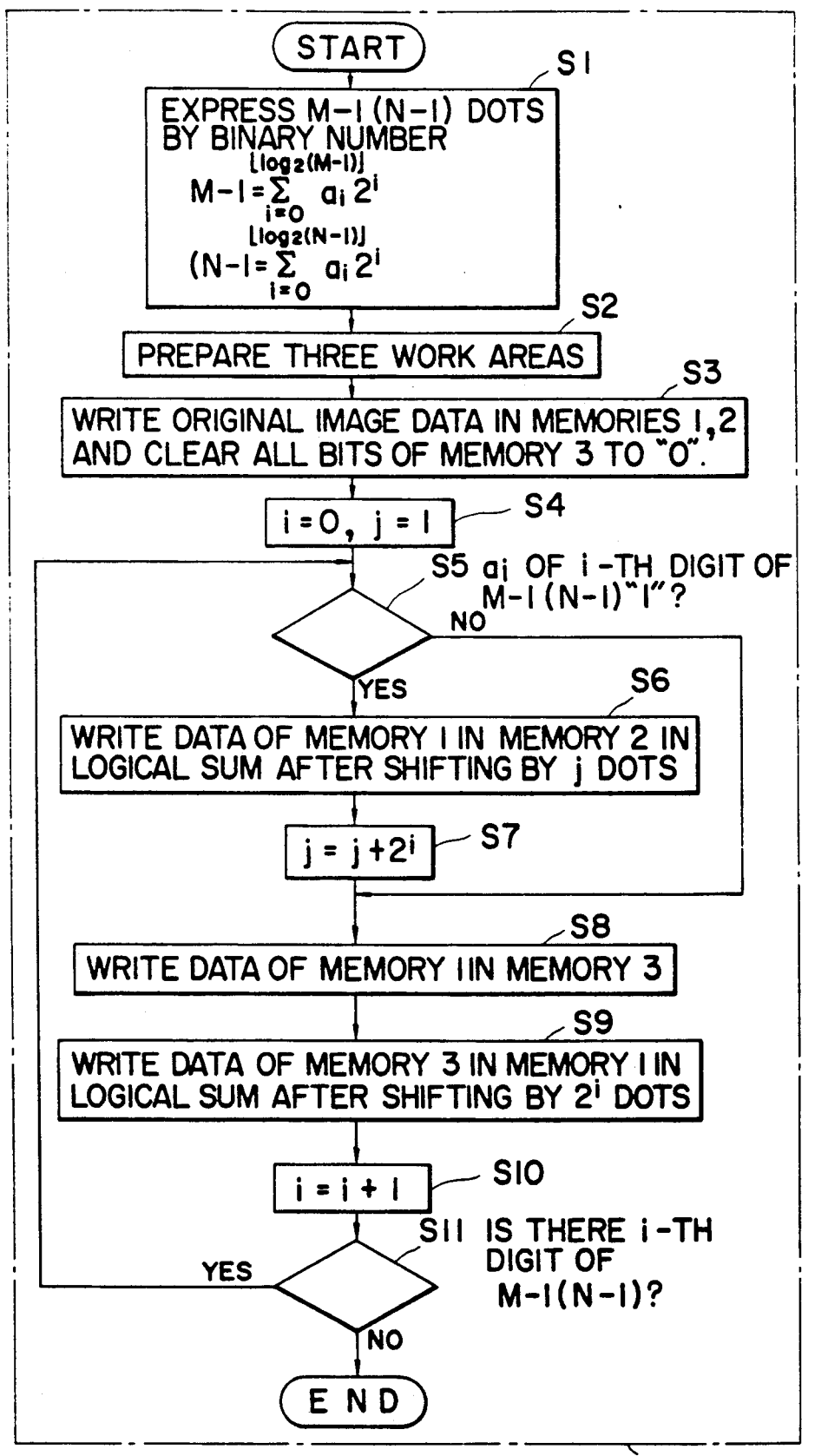

An embodiment of the image processing method will be described with reference to flow charts shown in FIGS. 1 and 2. This embodiment is for shadowing a dot-matrixed bit-map original data in an amount of n dots to the right and m dots to the upper side of the original image. The numbers n and m dots in this case are determined to meet the following conditions.

$m > n$ m and n are positive integers m and n are elementary to each other

In the Step S11, $\lfloor m/n \rfloor$ and $\lceil m/n \rceil$ are computed and determined as M and N, respectively, where $\lfloor m/n \rfloor$ and $\lceil m/n \rceil$ respectively represent intergers obtained by rounding off and rounding up the decimals of the quotient "m/n." In the step S12, three work areas which are equivalent to original image data are prepared. These three areas are referred to as work memories A, B and C, respectively. Then, a process A is started (see FIG. 2). When M and N are equal to each other, two work memories are used. The process A is a process for enlarging the original image data by (M−1) dots and (N−1) dots, respectively, to the upper side.

In Step S1, (M−1) is expressed as a binary code in the following formula (1).

$$M - 1 = \sum_{i=0}^{\lfloor \log_2(M-1) \rfloor} a_i 2^i \tag{1}$$

where, $a_i$ represents digit bits, while $\log_2 (M-1)$ represents an integer obtained by rounding off the decimal part of $\log_2 (M-1)$.

In Step S2, three work areas which are equivalent to the original image data are prepared. These three areas are referred to as work memories 1, 2 and 3, respectively. In Step S3, the above-mentioned image data are written in the work memories 1 and 2, and all the bits in the work memory 3 are cleared to "0". Then, the digit bits $a_i$ of the binary number (M−1) are examined beginning with the least significant digit. Namely, conditions i=0 and j=1 are set in Step S4, and whether $a_o$ is "0" or "1" is determined in Step S5. When $a_o$ is "0", the data written in the work memory 1 is written in the work memory 3 in the Step S8. Then, data written in the work memory 3 is dot-shifted an amount $2^o = 1(2^i)$, and the logical sum of the dot-shifted data and the data written in the work memory 1 is written into the work memory 1 in Step S9. Step S10 sets the condition of i=i+1=0+1+1 and Step S11 determines whether the (M−1) has the next digit bit. When there is the next digit bit, the process returns to Step S5 to determine whether the next digit bit $a_j$ is "0" or "1". On the other hand, when $a_o$ is determined to be "1" in the Step S5, the data in the work memory 1 is dot-shifted by 1(j) dots, and the logical sum of the dot-shifted data and data written in the work memory 2 is written in the work memory 2 in the Step S6. Step S7 sets conditions of $j = j+2^i = 1+2^o = 2$, while the Step S10 sets the condition of $i = i+1 = 0+1 = 1$. Then, the Step S11 is executed to determine whether the next digit bit exists in (M−1). If there is the next digit bit, the process returns to the Step S5 to conduct the above-described operation once again. The operation is ceased when absence of the next digit bit is detected in the Step S11.

As a result, data of an image which has been obtained by enlarging the original image data by (M−1) dots to the upper side is generated in the work memory 2. This data is then written in the work memory B. Since M equal to N or (N+1), it is formed by enlarging the data in the work memory 2 by one dot and the thus enlarged data is written in the work memory C. At the same time, the original image data is written in the work memory A. These operations are conducted in the Step S13.

In Step S14, the following formula (2) is computed and, in Step S15, the result of the computation is set to R.

$$f(k) = \left\lfloor \frac{m}{n}(k+1) + \left(\frac{1}{2}\right) \right\rfloor - \left\lfloor \frac{m}{n}k + \frac{1}{2} \right\rfloor \quad (2)$$

$$\text{where,} \left\lfloor \frac{m}{n}(k+1) + \frac{1}{2} \right\rfloor$$

represents integer obtained by rounding off the decimal portion of $$\text{``}\frac{m}{n}(k+1) + \frac{1}{2}\text{''}$$

$$\text{while,} \left\lfloor \frac{m}{n}k + \frac{1}{2} \right\rfloor$$

represents integer obtained by rounding off the decimal portion of $$\text{``}\frac{m}{n}k + \frac{1}{2}\text{''}$$

Then, in Step S16, whether a condition of R=M or R=N is determined met. When the condition of R=M is met, the data written in the work memory B is written in the Step S17 by logical sum in a position within the work memory A which is shifted k dots to right and j dots to the upper side from the position of the data written in the work memory A. However, if the condition of R=N is confirmed in the Step S16, the data written in the work memory C is written in Step S18 by logical sum in a position within the work memory A which is shifted k dots to right and j dots to the upper side from the position of the data written in the work memory A.

In the Step S19, conditions of k=k+1 and j=j+R are set and, in Step S20, whether k≦n or k>n is met is determined. When k≦n is met, the process returns to Step S15 and the above-described operation is repeated, whereas, when k>n is met, the process is terminated. As a result an image data with a shadow in amount of n dots to the right and m dots to the upper side is generated in the work memory A.

The foregoing description of the embodiment is based on the assumption that m>n is met. Conversely, when the condition n>m is met, the above-described method is met with the upward shift and the rightward shift substituted respectively by downward shift and leftward shift, respectively.

A discussion will be given of the cases where n and m are in the following relationships to each other.

When n=m is met, shadowed image data can be obtained by executing only the process A and enlarging the original image by m (n) dots obliquely in 45° direction. Namely, the shadowed image data can be formed by effecting upward shift and, concurrently, rightward shift in the process A.

When one of n and m is zero, the process is as follows. Namely, when condition of n=0 is met, the shadowed image data is obtained by executing only the process A and enlarging the original image by m dots in the upward direction, whereas, when m=0 is met, the shadowed image data is obtained by executing only the process A and shifting the original image data by n dots in the rightward direction.

When, n and m have a common divisor, the above-described shadowing process alone is executed by setting the conditions as $n = kn_1$ and $m = km_1$ so as to form an image data which is shadowed by $n_1$ dots to the right and $m_1$ dots to the upper side. Using this obtained data as the original image data, a shadowing operation is conducted so as to form a shadow in the amount of k units (one k unit has the size of $n_1$ and $m_1$ dots), both rightward and upward. Thus, in this case, shifting by one unit means to effect a shift by $n_1$ dots to the right and $m_1$ dots to the upper side.

The number $C_s(n, m)$ of repetition of the process to be conducted until data with a shadow of n dots to the right and m dots to the upper side is given by the following formula (3).

$$C_s(n, m) = 3 + \left\lfloor \log_2 \left\lfloor \frac{m}{n} \right\rfloor \right\rfloor \times 2 + \text{coef}\left( \left\lfloor \frac{m}{n} \right\rfloor \right) \quad (3)$$

where, coef ( m/n ) represents the number of the digit bits which bear "1" when m/n is expressed by decimal notation.

As will be understood from the foregoing description, according to the image processing method of the present invention, a shadowing operation, for example, on dot-matrixed bit map data can be conducted by repeating a shift by a minimum number corresponding to the amount of shadowing. It is therefore possible to remarkably shorten the processing time as compared with the conventional processing method in which shifting operation is conducted in a dot-by-dot manner, thus making it possible to adapt to high-speed processing of image.

It should be understood that many modifications and adaptations of the invention will become apparent to those skilled in the art and it is intended to encompass such obvious modifications and changes in the scope of the claims appended hereto.

What is claimed is:

1. An image processing method for performing a diversification process on a dot-matrixed bit-map original image data, said method comprising the steps of: preparing a predetermined image data on the basis of the quotient of (m/n), forming at least two work areas that are equivalent in size to said original image data, creating at least two sets of image data corresponding to said predetermined data in at least two work areas, a first set of image data corresponding in size to n, and a second set of image data corresponding in size to m, and logically combining said image data in said at least two work areas with said original image data, thereby conducting said diversification processing at a high speed.

2. An image processing method according to claim 1, wherein three work areas equivalent in size to said portion of said original image data are formed, and wherein said predetermined image data is formed by successively rewriting said original image data in said three work areas on the basis of the digit bits of a predetermined binary value which is determined from said quotient.

* * * * *